United States Patent [19]

Shore

[11] Patent Number: 5,482,331
[45] Date of Patent: Jan. 9, 1996

[54] QUICK CONNECT COUPLING DEVICE

[76] Inventor: James B. Shore, 41 Wildcat Mountain Rd., Waynesville, N.C. 28786

[21] Appl. No.: 377,409

[22] Filed: Jan. 24, 1995

[51] Int. Cl.⁶ ............................ F16L 37/10; F16L 37/12; F16L 37/18
[52] U.S. Cl. ........................... 285/314; 285/38; 285/345; 285/351; 285/312; 285/922
[58] Field of Search .................................. 285/314, 308, 285/320, 312, 38, 347, 351, 345

[56] References Cited

U.S. PATENT DOCUMENTS

| | | | |
|---|---|---|---|
| 2,468,849 | 5/1949 | Trainor | 285/314 |
| 2,849,245 | 8/1958 | Baker | 285/922 X |
| 3,082,042 | 3/1963 | Collar | 285/314 X |
| 4,402,533 | 9/1983 | Ortloff | 285/314 X |
| 4,898,287 | 2/1990 | Blatt | 285/312 X |
| 5,020,591 | 6/1991 | Shore | 166/55 |
| 5,356,183 | 10/1994 | Cole | 285/314 X |
| 5,368,343 | 11/1994 | Allen | 285/312 |

*Primary Examiner*—Stephen J. Novosad
*Attorney, Agent, or Firm*—Donald H. Fidler

[57] ABSTRACT

A quick connect coupler for interconnecting pressure sealed housings with pin and socket members where the socket member has a sealing bore and locking grooves. The pin member has a first rotatable ring assembly and a second rotatable ring assembly is mounted on the first ring assembly. A rotatable pawl member in the second ring assembly interlocks the socket member and the ring assemblies against axial and rotational movement. When actuated, the pawl member releases to permit relative rotation to an unlock position where the pawl member is used as a cam member to move the assemblies axially relative to one another to release the sealing connection as well as the locking interconnection.

16 Claims, 7 Drawing Sheets

QUICK CONNECT COUPLING DEVICE

RELATED MATTER

The invention herein is related to a prior patent issued to the inventor, James B. Shore, U.S. Pat. No. 5,020,591, issued Jun. 4, 1991.

FIELD OF THE INVENTION

This invention relates to quick coupling connector devices, and more particularly to quick connector coupling devices for use with pin and socket housings having O-ring pressure seals.

BACKGROUND OF THE INVENTION

As disclosed in U.S. Pat. No. 5,020,591, in certain oil field equipment it is necessary, from time to time, to couple lengths of tubular housings to one another from a location on the floor of the drilling rig. The housings are typically pin and socket members which are threadedly interconnected to one another and sealed with O-ring pressure seals. The housings, in a longitudinally aligned relationship, form an elongated housing or tool which is transported into a well bore which traverses earth formations. Typically, the well bore which transverses earth formations is filled with drilling or other type of control liquid and the hydrostatic pressures and temperature down hole are significantly greater than ambient temperature and pressure. As a consequence it is both necessary and desirable to use O-ring or packing sealing elements in the various interconnections between adjacent housings to prevent the intrusion of fluids under well bore pressure to the interior of the well tool housings.

Because operational time in a drilling process is very expensive, the time required to threadedly couple or make up the connection of tubular housing members to one another for a well bore operation can be an significant cost factor. In addition, the types of coupling threads employed to interconnect adjacent housings are expensive to cut or machine and care must be taken in assembly to avoid improper threading or galling of the threads during makeup. This is particularly true with oil well perforating devices and logging tools where the length of the tools can require a substantial number of housings to be threadedly interconnected.

THE PRESENT INVENTION

The present invention involves a quick connect coupling device for interconnecting a pin housing member with a socket housing member where the device includes annular locking grooves in the socket member and the pin member has a locking assembly carrying segmental locking elements which are selectively operated to engage and interconnect housing members to one another and to disengage from the locking grooves to release the housing members from one another.

The locking assembly on the pin member includes an annular first ring assembly rotatably mounted on the pin member and an annular second locking ring assembly mounted on the first ring assembly for limited angular rotation relative to the first ring assembly. The first and the second ring assemblies respectively can be made in semi-cylindrical, mirror image components and bolted together to form tubular ring assemblies.

The second locking ring assembly has a tubular support ring with a central axis. Diametrically arranged, elongated segmental locking elements are pivotally mounted by arm members to pivot pins located in notches in the support ring. The locking elements have a limited radial movement of the depending free end of the locking elements between a radial locking position in locking engagement with the annular locking grooves in the socket member and a radial unlocking position out of engagement with the annular locking grooves. At least one of the locking elements has an inwardly extending cam support with transversely arranged cam pins which cooperate with an internal cam surface on the first ring assembly. The cooperation occurs so that the locking elements are radially pivoted inwardly into recesses in the first ring assembly to unlock the locking elements.

When a coupling connection is desired between two housings, the pin member of one housing is received in the socket member of the other housing so that O-rings on the pin member are in sealing engagement with a sealing wall in the socket member. In this position the locking elements on the second ring assembly are extended radially outward into engagement with the locking grooves in the socket member and retained in position by a supporting wall surface on the first ring assembly. In this condition, the pin member can not be moved axially with respect to the socket member. To prevent inadvertent rotation or release of the members, the second ring assembly has a pawl member which is located in a recess in a support ring of the second ring assembly. The pawl member is pivotally mounted on a common pivotal axis as a locking element and is centrally located between a bifurcated arm portions of a locking element. The pawl member, in a locking position, has a locking first finger which is disposed within a locking notch or end groove in the end surface of the socket member and has a second angularly displaced cam finger which is disposed in a locking recess in the first ring assembly. Thus, the pawl member keys or locks the socket member, the first ring assembly, and the second ring assembly to one another. To retain the pawl member in a fixed position, a spring lock detent member may be provided in the second ring assembly to engage a detent recess in the pawl member which provides assurance that the pawl member does not prematurely rotate from a locking position or unlocking position.

To release the quick connect coupling, a first spanner bar is inserted into a bar opening in the pawl member and a second spanner bar is inserted into an bar opening in the first ring assembly. The first spanner bar is rotated downward in a plane which intersects the central axis of the assemblies. When the pawl member is rotated about its axis for about 20°, the first locking finger on the pawl member clears or is released with respect to the locking notch in the socket member and the cam second finger on the pawl member is released from the locking recess in the first ring assembly. This brings the spanner bar in the pawl member to a position approximately normal to the central axis of the tool and the first and second assemblies are rotated 90° about the central axis relative to one another by use of the spanner bars. The relative rotation of the assemblies about the central axis is limited by the cam finger on the pawl member which rides in a transverse cam slot in the first ring assembly for 90° of relative rotation. When the first and second ring assemblies have been rotated through this relative 90° angle about the central axis, the pawl member is again rotated about its pivot axis by moving the spanner bar in a downward direction so that the cam finger on the pawl member engages the first ring assembly and has sufficient leverage to cam the first ring assembly upwardly or axially relative to the second ring assembly. This effectively moves the O-rings in the pin member from a sealing position to an unsealing position in the socket member so that the two housing members may be easily separated from one another.

At the same time that the first and second ring assemblies move axially relative to one another, the cam pins on the cam support engage an internal cam wall surface of the first ring assembly and act cooperatively to move a locking element inwardly into a recess in the first ring assembly. When the locking elements are disengaged from the locking grooves in the socket member, the locking interconnection between the tool, the pin member, and the socket member is released.

The tool is quickly connected the same way it is disassembled i.e. the pin member has the locking elements positioned in a retracted position in recesses on the first ring assembly and is inserted into the socket member. The spanner bars are inserted into the pawl bar opening and the bar opening in the first ring assembly. The spanner bar in the pawl member is rotated and has sufficient leverage to cam the first ring assembly downward and axially relative to the second ring assembly to move the O-rings into sealing engagement. At the same time, the locking elements are released and can be moved outwardly toward engagement with the locking grooves. When the lower end of the first ring assembly engages the upper end of the second ring assembly, the first and second ring assemblies are rotated about the central axis of the assemblies for 90° relative to one another which brings the pawl member into position where an upward movement of a spanner bar rotates the pawl member and brings the pawl finger into locking engagement with the locking notch in the socket member and the cam finger into locking engagement with the respect to the locking recess in the first ring assembly.

DESCRIPTION OF THE PRESENT INVENTION

Figure 1A:
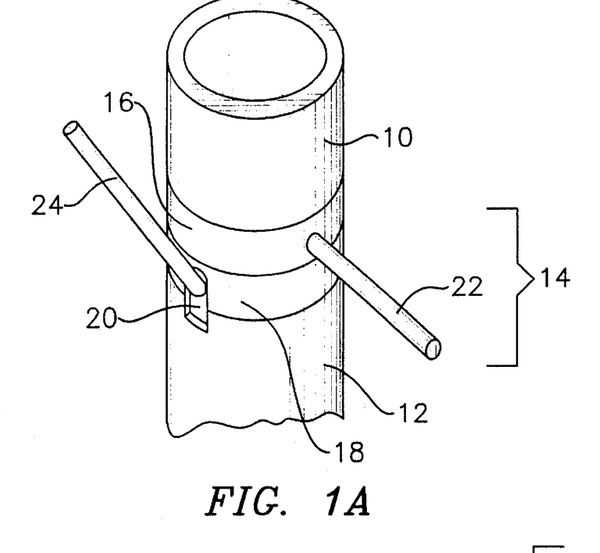
FIG. 1A 1B, 1C schematically illustrate the manual functioning of the quick connect device.

Referring now to FIG. 1A, an assembly of adjoining coupled housings is illustrated with upper and lower housings 10 and 12 which are interconnected with respect to one another by quick coupler device or assembly 14, which includes a first ring assembly 16, and an second ring assembly 18. In an initial interconnected position, (see FIG. 1A) a pivotally mounted pawl member 20 in a recess in the second ring assembly 18 interconnects the lower housing 12, the first ring assembly 16 and the second ring assembly 18 to one another against relative rotation. It will be noted that while this interconnection remains fixed, these three elements can, if desired, be rotated with respect to the upper housing 10 or can be fixed with respect to the upper housing, as may be desired, with set screws or the like (not shown).

Figure 1B:
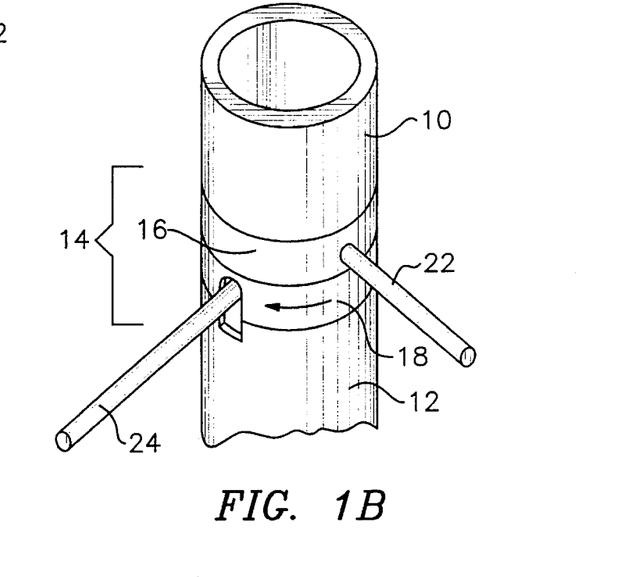
Figure 1C:
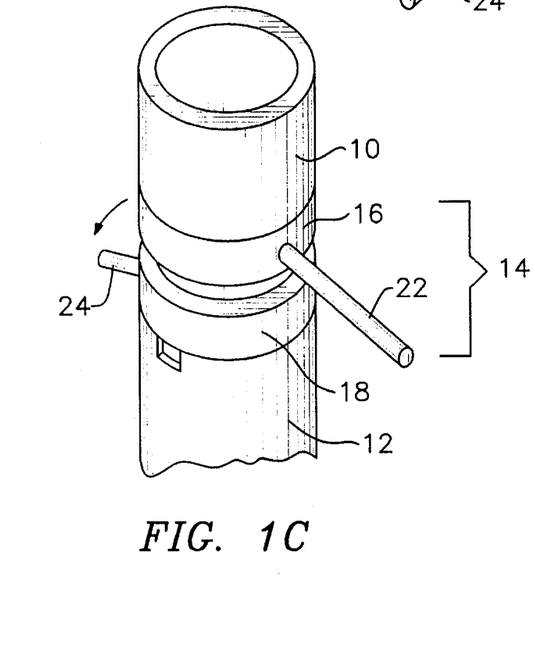

To operate the quick connect coupler device and to uncouple the upper housing 10 from the lower housing 12, a spanner bar or spanner member 22 is inserted into an spanner or bar opening which is located in the side of the first ring assembly 16. Another spanner bar or spanner member 24 is inserted into a spanner opening located in the pawl member 20 in the outer second ring assembly 18. The spanner member 24 is moved in a plane which intersects the central axis of the assembly to rotate the pawl member 20 about its pivot axis for approximately 20°. (see FIG. 1B) This releases the interlock or interconnection by the pawl member 20 of the first ring assembly 16, the second ring assembly 18 and the lower housing 12 so that the first ring assembly 16 and the second ring assembly 18 may be relatively rotated with respect to one another through 90° about a longitudinal central axis to locate the pawl member 20 in a position in the first ring assembly where the lower housing or socket member 12 can be released from a locking engagement with the upper housing 10. A downward movement of the spanner bar 24 in a plane which intersects the central axis tool member rotates the pawl member about its pivot axis (see FIG. 1C) and causes the first ring assembly 16 to be cammed upwardly or moved in an axial direction relative to the second ring assembly 18. The upward relative movement is sufficient to release the O-rings from a sealing bore in the well tool. At the same time, the locking elements (not shown in FIG. 1A–1C) are displaced into recesses in the first ring assembly and release the coupling, as will be explained hereafter.

Figure 2:
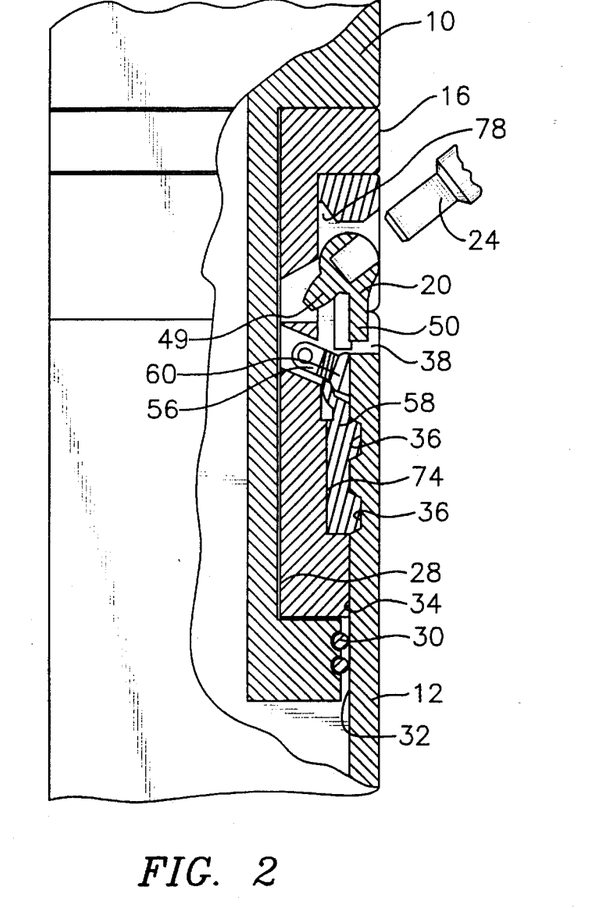
FIG. 2 is a view in partial longitudinal cross-section of the assembled quick connect device in a locked position.

Referring now to FIG. 2, a pin member on a housing 10 is generally cylindrically shaped and has, at its lower end, a cylindrical recess 28 for rotatably receiving the first ring assembly 16. The second ring assembly 18 is mounted for limited angular rotation through a 90° angle relative to the first ring assembly 16. Below the cylindrical recess 28, the pin member has O-rings 30 which are adapted to sealingly engage with a sealing surface 32 in the bore of the socket member 12. The socket member 12, at a location just above the sealing surface 32, has an enlarged bore diameter 34 so that the O-rings 30, when moved into the enlarged bore diameter 34, are relieved of pressure and permit easy disconnection of the pin member from the socket member. Also located in the bore of the socket member are spaced apart annular locking grooves 36 in the socket member. At the terminal end of the socket member there is a locking notch 38 or groove which is generally square or rectangularly shaped and cooperates with the pawl member 20, as will be described hereafter.

The first ring assembly 16 is tubular shaped and can be formed from two identically configured, semi-circular or semi-annular members which can be bolted together to form a unitary tubular assembly. The semi-circular members are made identical for convenience in that investment casting be utilized to form the intricate details of the devices at a minimum cost if the units are mirror images of one another. Machining to the desired configuration is another option.

Figure 3:
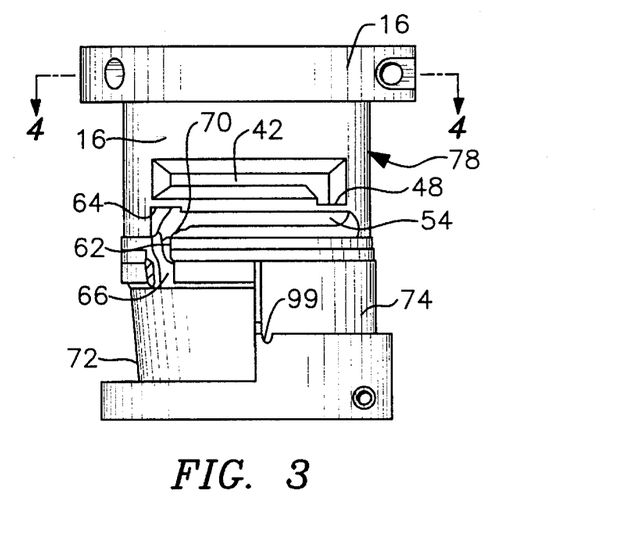
FIG. 3 is a side view of one half of an first ring assembly.
Figure 4:
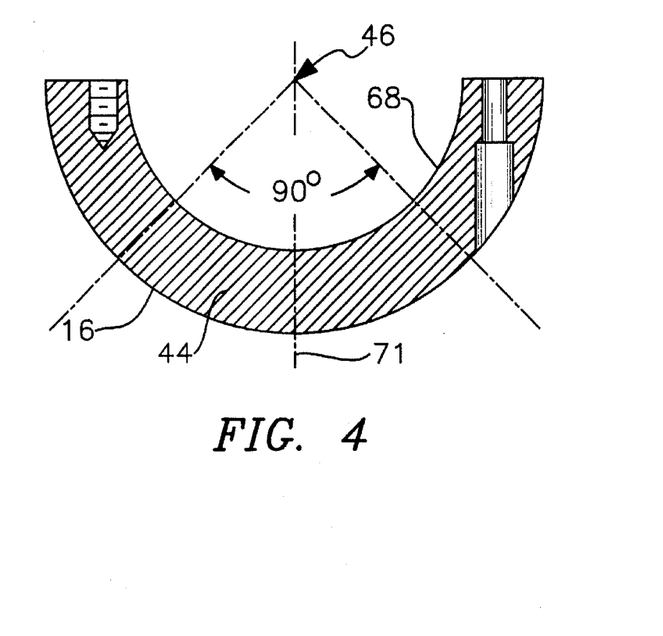
FIG. 4 is a top view taken along line 4—4 of FIG. 3.

As shown in FIG. 3 at least one of the semi-cylindrical elements of the first ring assembly has a transverse, V-shaped cam opening 42. The opening 42 extends through the wall 44 of the element (see FIG. 4). The cam opening 42 extends circumferentially through an angle of 90° about a central longitudinal axis 46 to permit limited movement of the pawl member 20 in the second ring assembly 18 relative to the first ring assembly 16. At one end of the transverse opening 42 is a lower locking recess 48 which receives and accommodates a cam finger 49 on the pawl member 20 to lock the first ring assembly 16 relative to the second ring assembly 18. Below the cam opening 42 is a second circumferentially extending and transverse recess 54 which provides a guide recess for a guide lug 56. The guide lug 56 projects inwardly from a central surface of a locking element 58 (see FIGS. 5 & 7). The guide lug 56 (see FIG. 5 & 7) is a rectangular element which projects radially inward from a central portion of a locking element 58. It is attached to the locking element by a screw member 60. At the end of the guide lug 56 are transverse cam pins 57. In an unlocked position, the cam pins 57 will engage an interior cam surface 70 as described below with respect to FIG. 10.

At the other end of the recess opening 54, there is a vertical opening 62 which extends through the wall 44 of the element. The upper end of the vertical opening 62 has a locking finger recess 64 above the guide opening 54 while the lower end 66 of the vertical opening 62 extends below the transverse recess opening 54. Also, on the internal wall 68 of the semi-cylindrical element is a concavity which forms a cam surface 70 located on either side of the vertical opening 62. Intermediate of the circumferential length of the cam opening 42 is a vertical plane 71 (see FIG. 4) which intersects the central axis 46. On the side of the plane 71 where the vertical opening 62 is located, the semi-cylindrical element has a recessed section 72 through a 90° angle which forms a recess for retraction of a locking element 58 while, on the other side of the vertical plane 71 the outer surface 74 is configured to provided the supporting locking surface through a 90° angle for a locking element 58.

Figure 5:
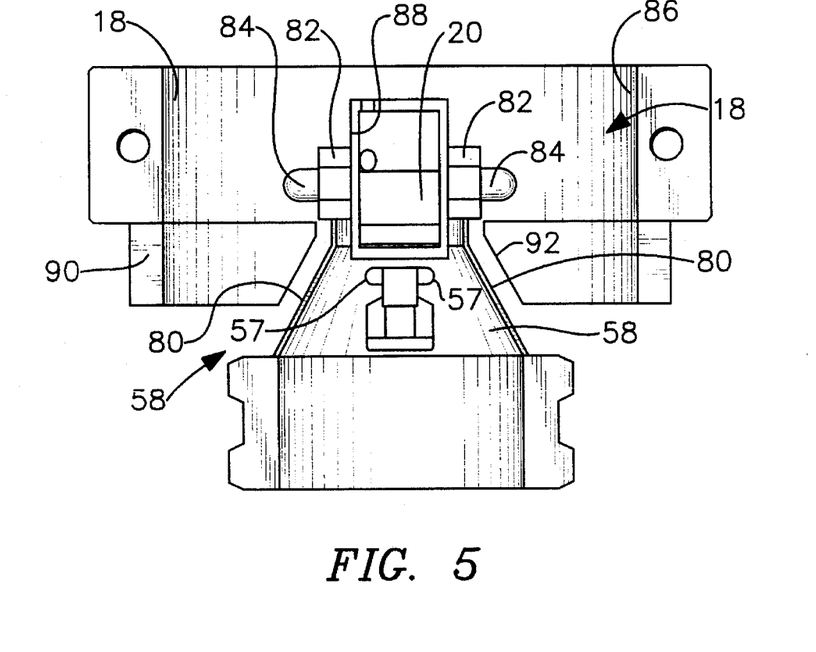
FIG. 5 is a side view of one half of a second ring assembly taken from a central axis looking toward the interior surface and illustrating a locking element which is attached to the support body and showing a pawl member and cam element.
Figure 6:
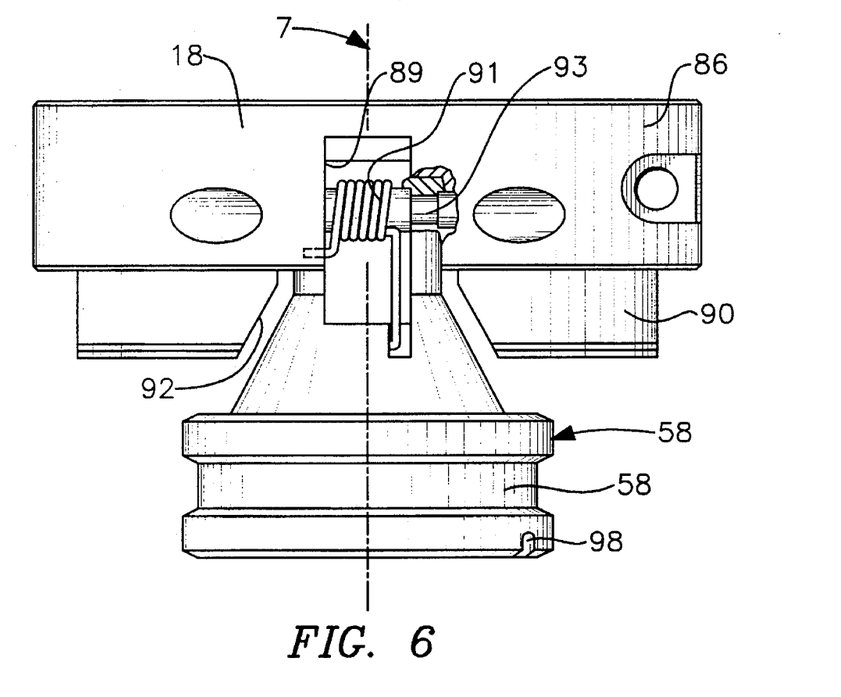
FIG. 6 is an outer side view of the other half of a second ring assembly and illustrating a locking element attached to the support body and with a spring element.
Figure 7:
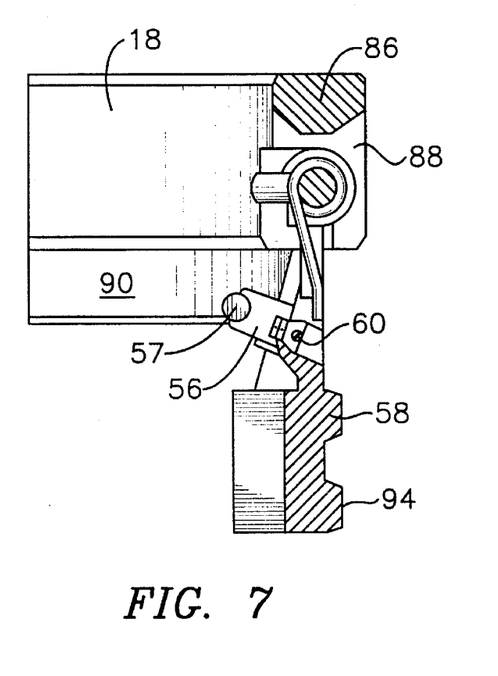
FIG. 7 is a view taken in cross-section along line 7—7 of FIG. 6.
Figure 8:
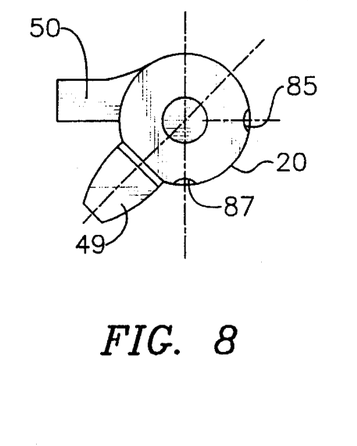
FIG. 8 and 9 are respectively, side and front views of a pawl member utilized in the present invention.
Figures 9, 10:
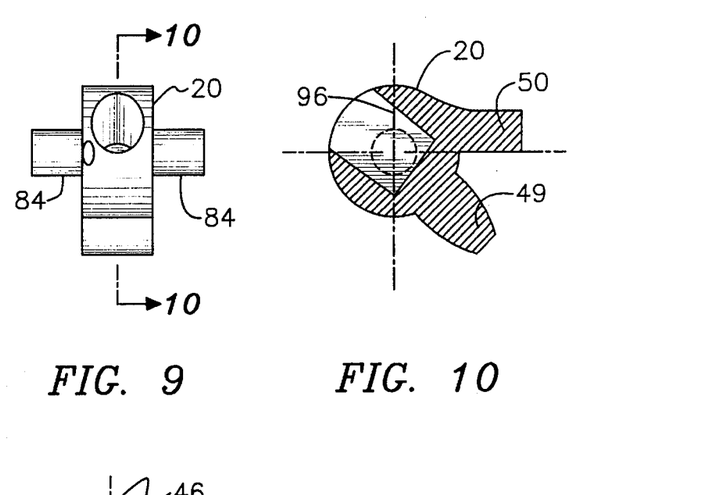
FIG. 10 is a view taken along line 10—10 of FIG. 9.

Referring now to FIGS. 5–7, the second ring assembly 18 can also be formed in semi-cylindrical or semi-annular elements similar to the first ring assembly 16 and can be bolted together on a recess 78 on the first ring assembly 16 (see FIG. 2). The pawl member 20 is illustrated in FIGS. 8–10. As shown in FIG. 5, the pawl member 20 is received in a recess 88 in the wall of a locking element 58. The locking element 58 is a semi-cylindrical, arcuately shaped member with tapered edge surfaces 80 which extend upward to bifurcated support arms 82 which are pivotally mounted on a pin member 84 in a support member 86 of the second ring assembly 18. The pin member 84 lies on a pivot axis normal to the central axis 46 of the tool and pivotally mounts the pawl member 20 as well as the bifurcated support arms 82 on the support member 86.

A semi-cylindrical or semi-annular support member 86 of the second ring assembly 18, as shown in FIG. 6 and 7 includes an upper semi-cylindrical support member with a vertical recess 89 in the wall of the support member 86 and a lower semi-cylindrical guide element 90 with a reduced radius and with a vertical tapered slot 92 to accommodate a locking element 58.

Referring to FIGS. 5, 8, 9, 10, the pawl member 20 has pin elements 84 which are rotatably supported in the base support member 86 and a spring biased vertical pin element 95 located in the support member 86 which engages detent recess 85 or recess 87 to releasably hold the pawl member 20 in a locked or an unlocked position.

It is not necessary to use a pawl member 20 for each locking element 58 and, as shown in FIG. 6 and 7, a locking element 58 can be resiliently biased by a spring member 91 supported on a pin 93 so as to resiliently bias the locking element 58 radially inward toward the first ring assembly 16. The locking element 58 is a semi-cylindrical arcuate element with outer groove locking projections 94 sized to engage the locking grooves 36 in a socket member, as described heretofore.

Figure 11:
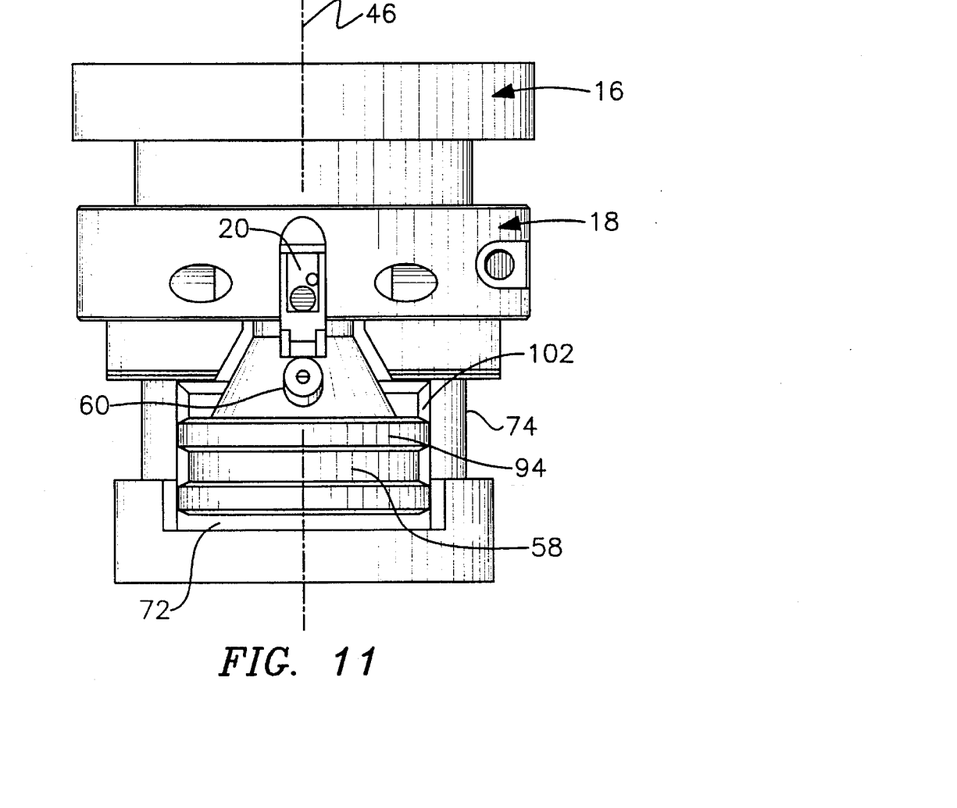
FIG. 11 is an exterior view of an assembled first and second ring assemblies.
Figure 12:
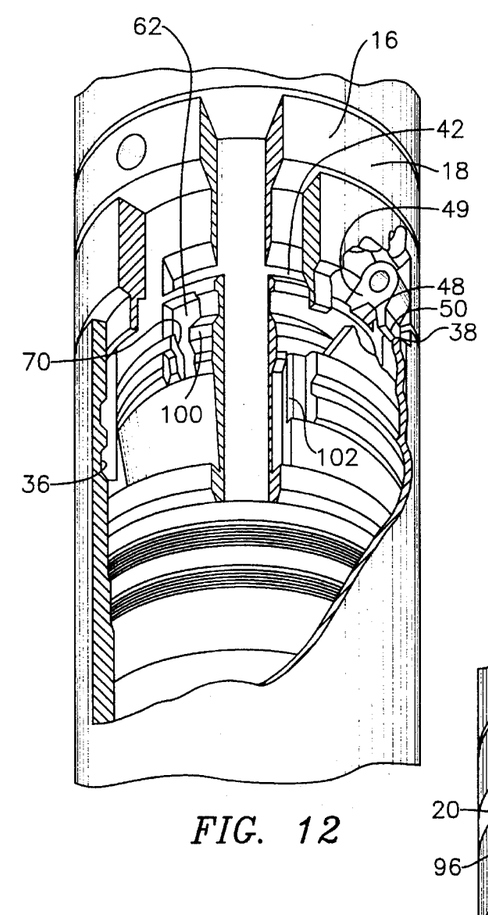
FIG. 12 is a view in perspective illustrating the first and second ring assemblies of the quick connect device in a locked position.
Figure 13:
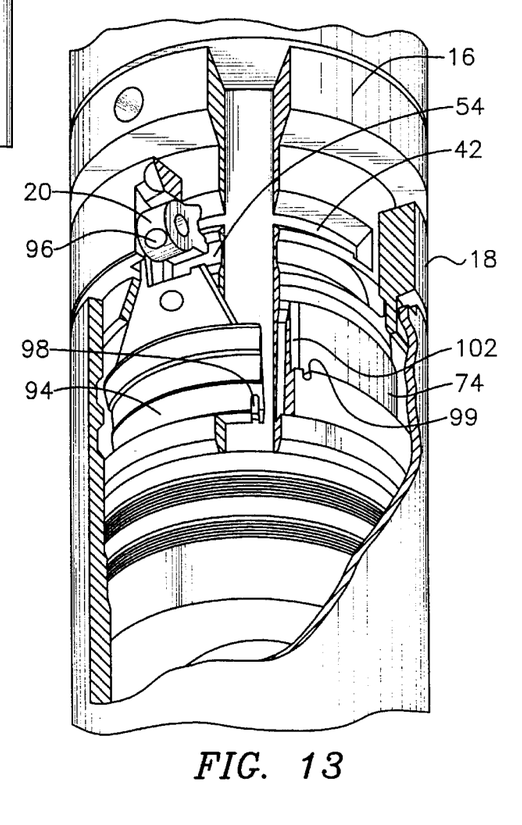
FIG. 13 is a view in perspective of the first and second ring assemblies of the quick connect device in a unlocked position.

Referring now to FIG. 11, when the second ring assembly 18 is assembled on the first ring assembly 16, the first ring assembly 16 is shown as moved axially relatively to the second ring assembly 18 by actuation of the pawl member 20 to an unlocking position. The second ring assembly 18 in the unlocked condition has the locking elements 58 disposed in recesses 72 in the first ring assembly 16 where the locking elements 94 are displaced inwardly from the locking grooves 36.

The combined organization and operation may be best understood by reference to FIGS. 12, 13 and 14A–14D. In a assembled condition, the diametrically located locking elements 58 have the locking projections 94 in engagement with the annular locking grooves 36 in the socket member and a locking surface 74 on the first ring assembly 16 prevents the locking elements 58 from being released from the locking grooves 36. (see FIG. 12 and FIG. 14A) The pawl member 20 has a locking finger element 50 disposed in the locking notch 38 in the socket member and the cam finger 49 on the pawl member 20 is disposed in the locking recess 48 in the transverse cam opening 42. The spring biased detent member 95 (see FIG. 5) prevents inadvertent rotation of the pawl member 20. The socket member, the first ring assembly 16, and the second ring assembly 18 are interconnected to one another both longitudinally and rotatively relative to one another.

Figure 14A:
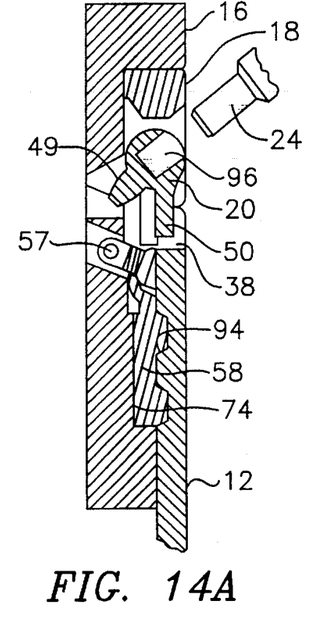
FIG. 14A, 14B, 14C and 14D are, respectively, sequential rotative relative angular positions of the first and second ring assemblies between a condition of locking the assemblies to one another and various unlocking conditions of the assemblies.
Figure 14B:
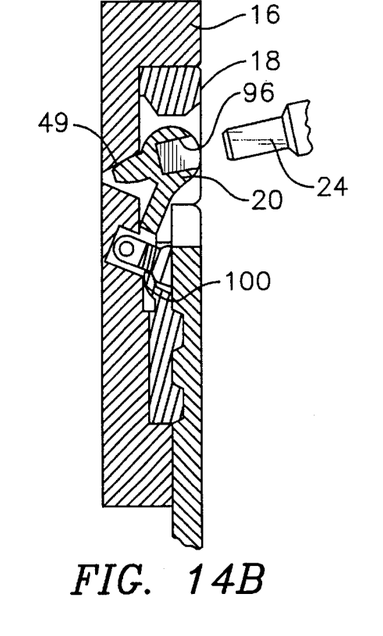
Figure 14C:
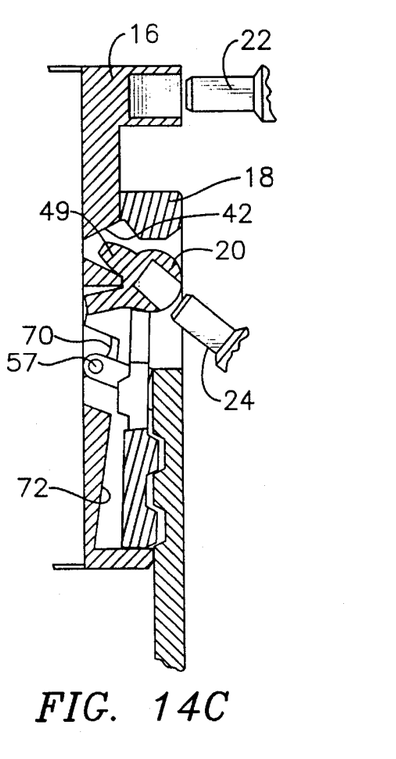

To perform a release of the pin member from the socket member, a spanner bar 24 is inserted into the pawl opening 96 in the pawl member 20 and the pawl member is rotated through an angle of about 20° so that the pawl locking finger 50 is released from the socket housing notch 38 and the cam finger 49 is released from the locking recess 48 in the first ring assembly 16 (see FIG. 14B). With a spanner bar 24 attached to the pawl opening 96 in the second ring assembly 18 and a spanner bar 22 in the first ring assembly 16, the first and second ring assemblies are moved relative to one another through a 90° angle about the central axis 46 which permits the pawl cam finger 49 of the pawl member 20 to slide in the pawl guide opening 42 from a release position to a limiting position at a 90° rotation. The system is provided with a safety device in the form of a small annular groove or notch 98 (see FIG. 6) at the end of a locking element and a facing notch 99 (see FIG. 13) in end wall surface on the first ring assembly. If, for any reason, there is internal pressure within the tool at the time that the notches 98 and 99 pass one another, the pressure will cause the two notches 98 and 99 to interfit and lock so that the tool can not be rotated further for release and accidently injure someone until the internal pressure is bled off. However, in the usual case where there is no internal pressure, the pawl is rotated to the position shown in FIG. 13.

Figure 14D:
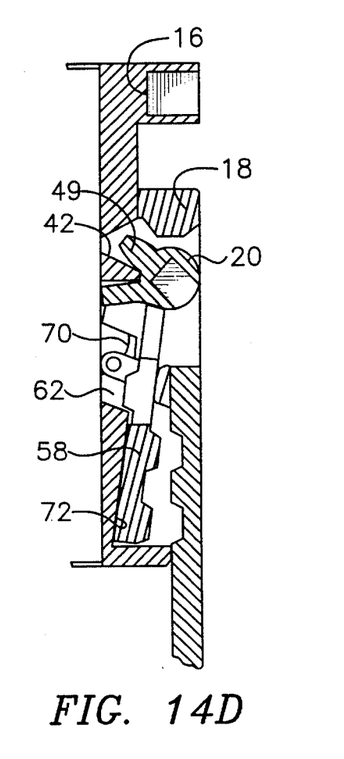

During the relative rotation the guide lug on a locking element is guided by the slot 54. When the pawl member 20 is located at the other end of the slot 42: the guide lug 56 on a locking element 58 is located in a vertical opening 62; the transverse cam pins 57 on a guide lug 56 engage an internal cam surface 70; and a recess 72 is located underneath a locking element 58. When the spanner bar 24 is then used to again rotate the pawl member 20, the cam finger 49 engages the surface of the cam opening 42 and sufficient leverage is available to cam the first ring assembly 16 upwardly relative to the second ring assembly 18 (see FIG. 14 and 14C). The cam pins 57 on a locking element 58 engage the internal cam surface 70 of the first ring assembly 16 and positively move a locking element 58 radially inward in a recess 72. On the locking element 58 with the spring element 91, the spring element 91 assists in the retraction of the locking element 58. As shown in FIG. 14D, at the full rotational limit of the pawl member 20, the locking elements 58 are fully retracted into the recesses 72.

To reassemble the tool, the operational is merely reversed. When the assemblies are rotated relative to one another to the locking position, the guide lug 56 engages another surface 100 which moves a locking element 58 outwardly upon engagement. Thus, it can be seen with the foregoing explanation that the quick connect assembly involves a simple positive acting cam interconnection to connect up and release a pin housing from a socket housing.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A coupling device for interconnecting a pin member with a socket member, said device including:

a socket member having at least one internal locking groove;

a pin member having an annular first ring assembly rotatably mounted on said pin member and a second ring assembly rotatably mounted on said first ring assembly for relative rotation between a rotative locking first position and a rotative unlocking second position; and said second ring assembly having at least one circumferentially disposed segmental locking element mounted for limited radial movement between a radial locking position in locking engagement with the locking groove in said locking first position and a radial unlocking position out of engagement with the locking groove in said unlocking second position, said first ring assembly having recess means for receiving such locking element in an unlocking position and support means for retaining such locking element in a locking position, said recess means and said support means being circumferentially spaced from one another;

pawl means located in said second ring assembly and having a pawl member mounted for pivotal movement about a pivot axis arranged normal to a central axis of the pin member, said pawl member having a cam finger element for engagement with a cam surface in said first ring assembly for moving said first and second ring assemblies axially of one another when said locking elements are in an unlocking position and when said pawl member is rotated about the pivot axis.

2. The coupling device as set forth in claim 1 and including limit means for limiting the relative rotation between the first and second ring assemblies.

3. The coupling device as set forth in claim 1 and including a transverse circumferential slot for limiting the relative rotation between the first and second assemblies and where said cam surface is on said slot.

4. The coupling device as set forth in claim 2 wherein said limit means includes a transverse circumferential slot and said cam surface is at one end of said slot, and where a locking recess is at the other end of the slot, said locking recess being sized to receive said cam finger element upon rotation of the pawl member for locking said first ring assembly and said second ring assembly against relative rotation.

5. The coupling device as set forth in claim 2 wherein said limit means includes a transverse circumferential slot and said cam surface is at one end of said slot, and where a locking recess is at the other end of the slot, said locking recess being sized to receive said cam finger element upon rotation of the pawl member for locking said first ring assembly and said second ring assembly against relative rotation, and wherein said pawl member has a locking finger element angularly displaced from the cam finger element and said socket member has a socket member recess sized to receive said locking finger element so that when said cam finger element is in said locking recess then said locking finger element is in said socket member recess and said first ring assembly, said second ring assembly and said socket member are locked against relative rotation.

6. The coupling device as set forth in claim 2 wherein said limit means includes a transverse circumferential slot and said cam surface is at one end of said slot and where a locking recess is at the other end of the slot, said locking recess being sized to receive said cam finger element upon rotation of the pawl member for locking said first ring assembly and said second ring assembly against relative rotation, and wherein said pawl member has a locking finger element angularly displaced from the cam finger element and said socket member has a socket member recess sized to receive said locking finger element so that when said cam finger element is in said locking recess then said locking finger element is in said socket member recess and said first ring assembly, said second ring assembly and said socket member are locked against relative rotation, and wherein there are two segmental elements which are diametrically arranged and said first ring assembly and said segmental locking elements have cam means for assisting the segmental locking elements to move from a locking position to an unlocking position.

7. The coupling device as set forth in claim 2 wherein said limit means includes a transverse circumferential slot and said cam surface is at one end of said slot and where a locking recess is at the other end of the slot, said locking recess being sized to receive said cam finger element upon rotation of the pawl member for locking said first ring assembly and said second ring assembly against relative rotation, and wherein said pawl member has a locking finger element angularly displaced from the cam finger element and said socket member has a socket member recess sized to receive said locking finger element so that when said cam finger element is in said locking recess said locking finger element is in said socket member recess and said first ring assembly, said second ring assembly and said socket member are locked against relative rotation, and wherein there are two segmental elements which are diametrically arranged and said first ring assembly and said segmental locking elements have cam means for assisting the segmental locking elements to move from a locking position to an unlocking position, and wherein at least one of said segmental locking elements has bifurcated arm members pivotally connected to pivot pin means in said second ring assembly and said pawl member is disposed between said arm members and pivotally connected to said pivot pin means.

8. The coupling device as set forth in claim 2 wherein said limit means includes a transverse circumferential slot and said cam surface is at one end of said slot and where a locking recess is at the other end of the slot, said locking recess being sized to receive said cam finger element upon rotation of the pawl member for locking said first ring assembly and said second ring assembly against relative rotation, and wherein said pawl member has a locking finger element angularly displaced from the cam finger element and said socket member has a socket member recess sized to receive said locking finger element so that when said cam finger element is in said locking recess said locking finger element is in said socket member recess and said first ring assembly, said second ring assembly and said socket member are locked against relative rotation, and wherein there are two segmental elements which are diametrically arranged and said first ring assembly and said segmental locking elements have cam means for assisting the segmental locking elements to move from a locking position to an unlocking position, and wherein said segmental locking elements have bifurcated arm members pivotally connected to pivot pin means in said second ring assembly and said pawl member is disposed between said arm members and pivotally connected to said pivot pin means on one of said segmental locking elements, and wherein spring means are disposed on the pivot pin means for the other of said segmental locking elements.

9. The coupling device as set forth in claim 2 wherein said socket member has a sealing bore for pressure sealing, and sealing means on said pin member disposed in said sealing bore in said locking position and released from said sealing bore when said unlocking element is in an unlocking position and said pawl member is rotated about the pivot axis.

10. A coupling device for interconnecting and pressure sealing a pin member with a socket member, said device including:

a socket member having a sealing bore, an enlarged diameter bore between the sealing bore and an end of the socket member, and an internal locking groove in said enlarged diameter bore;

a pin member having an end portion sized for reception in said socket member, an annular first ring assembly rotatably mounted on said pin member, an second ring assembly rotatably mounted on said first ring assembly, and sealing means between an end of the pin member and the first ring assembly, said first ring assembly and said second ring assembly respectively having first and second ring portions where said second ring portion engages the end of the socket member and engages the first ring portion in a interconnected condition of the coupling device, locking means including at least one circumferentially disposed segmental locking element mounted for limited radial movement between a radial locking position in locking engagement with the locking groove and a radial unlocking position out of engagement with the locking groove, said first ring assembly having recess means for receiving such locking element in an unlocking position and support means for retaining such locking element in a locking position, said recess means and said support means being circumferentially spaced from one another;

said second ring assembly being relatively movable between a locking first position for said locking element and a rotative unlocking second position for said locking element; and pawl means located in the first ring portion of said second ring assembly and having a pawl member mounted for pivotal movement about a pivot axis arranged normal to a central axis of the pin member, said pawl member having a cam finger element for engagement with a cam surface in said first ring assembly, said pawl member being rotatable for moving said first and second ring assemblies axially of one another when said locking elements are in an unlocking position and for displacing said sealing means from said bore to said enlarged diameter bore.

11. The coupling device as set forth in claim 10 wherein said first ring assembly is constructed from semi annular parts with mirror image configurations, and attaching means for connecting the parts to one another.

12. The coupling device as set forth in claim 11 wherein said second ring assembly includes two semi annular parts with mirror image configurations, and attaching means for connecting the parts to one another.

13. The coupling device as set forth in claim 12 wherein there are diametrically opposed, mirror image segmental locking elements with bifurcated arm members connected to a locking portion where at least one of said bifurcated arm members and the pawl member are mounted for pivotal movement about said pivot axis.

14. The coupling device as set forth in claim 10 and including a transverse circumferential slot in said first assembly and said cam surface is at one end of said slot.

15. The coupling device as set forth in claim 14 and including a locking recess at the other end of the slot, said locking recess being sized to receive said cam finger element upon rotation of the pawl member for locking said first ring assembly and said second ring assembly against relative rotation, and wherein said pawl member has a locking finger element angularly displaced from the cam finger element and said socket member has a socket member recess sized to receive said locking finger element so that when said cam finger element is in said locking recess said locking finger element is in said socket member recess and said first ring assembly, said second ring assembly and said socket member are locked against relative rotation.

16. The coupling device as set forth in claim 15 where there are two segmental elements which are diametrically arranged and said first ring assembly and said segmental locking elements have cam means for assisting the segmental locking elements to move from a locking position to an unlocking position, and wherein said segmental locking elements have bifurcated arm members pivotally connected to pivot pin means in said second ring assembly and said pawl member is disposed between said arm members and pivotally connected to said pivot pin means on one of said segmental locking elements, and wherein spring means are disposed on the pivot pin means for the other of said segmental locking elements.

* * * * *